United States Patent [19]

Kresky et al.

[11] 4,162,801

[45] Jul. 31, 1979

[54] GAS LINE LEAD-IN ASSEMBLY

[75] Inventors: Fred C. Kresky; John H. Loveland; Bryce B. Evans, all of Jackson, Mich.

[73] Assignee: Aeroquip Corporation, Jackson, Mich.

[21] Appl. No.: 861,106

[22] Filed: Dec. 16, 1977

[51] Int. Cl.² ............................................. F16L 11/12
[52] U.S. Cl. ..................................... 285/45; 285/138; 285/226; 285/256; 285/382
[58] Field of Search ............ 285/45, 47, 138, DIG. 4, 285/114, 382, 52, 53, 15, 226, 256

[56] References Cited

U.S. PATENT DOCUMENTS

| | | | |
|---|---|---|---|
| 2,366,809 | 1/1945 | Seeman | 285/226 |
| 2,712,456 | 7/1955 | McCreery | 285/226 |
| 3,244,438 | 4/1966 | Bucheit | 285/15 |
| 3,549,176 | 12/1970 | Contreras | 285/226 X |
| 3,844,587 | 10/1974 | Fuhrmann | 285/138 |
| 3,861,719 | 1/1975 | Hand | 285/47 |
| 3,944,262 | 3/1976 | Stiner | 285/53 |
| 3,970,334 | 7/1976 | Campbell | 285/226 X |
| 4,005,880 | 2/1977 | Anderson et al. | 285/47 |
| 4,066,283 | 1/1978 | Struck | 285/53 |

Primary Examiner—Dave W. Arola
Attorney, Agent, or Firm—Beaman & Beaman

[57] ABSTRACT

A conduit assembly for natural gas lines utilized at transition locations wherein a synthetic plastic gas supply tube connects to a meter or other fitting located above the ground level. The lead-in assembly utilizes a fitting having a rigid elongated nipple to which a polyethylene tube is sealed by means of a crimped socket; and a convoluted metal hose attached at one end to the fitting, and sealed at the other end to the polyethylene tube, encompasses the nipple and tube providing effective protection thereof, yet permits the assembly to be readily bent and formed by hand without kinking of the tube.

5 Claims, 3 Drawing Figures

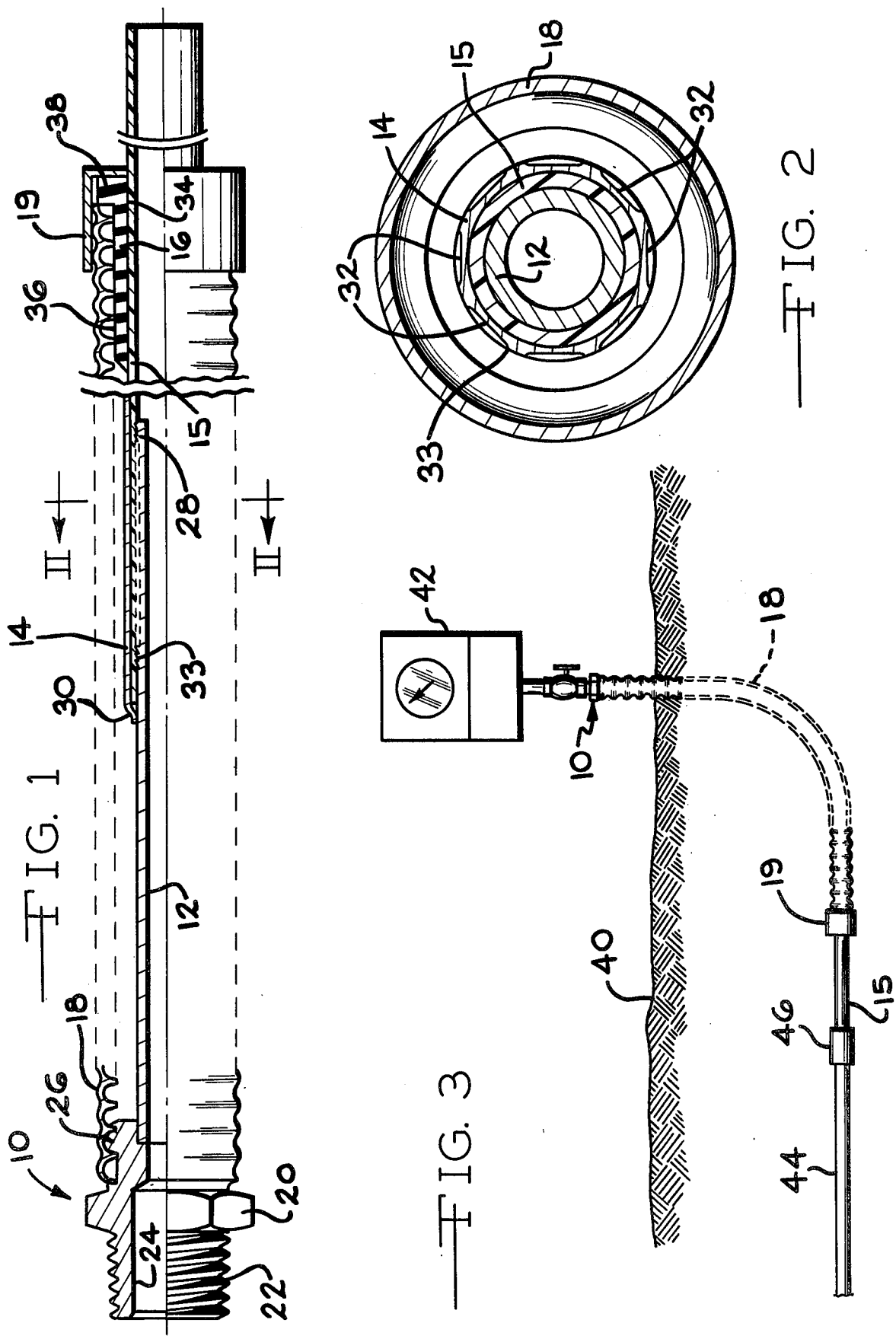

GAS LINE LEAD-IN ASSEMBLY

BACKGROUND OF THE INVENTION

The invention pertains to natural gas line lead-in assemblies utilizing inner conduit structure encased within a convoluted metal sheath.

Natural gas supply conduits for residential and industrial use are buried several feet below the ground surface, and it is now common practice to utilize synthetic plastic, such as polyethylene, in the manufacture of high pressure gas supply tubing. However, as gas meters and other components and fittings employed in natural gas systems are normally located above ground level safety codes require that above ground level gas conduit be metal, or protected by metal, in order to minimize the possibility of the conduit being inadvertently severed or the gas ignited.

Accordingly, gas lead-in assemblies are commonly employed in natural gas supply systems at the location where the buried polyethylene tubing approaches the gas meter or other apparatus mounted above the ground level. Such assemblies usually consist of a metal or nonmetal lower conduit adapted to be coupled to the polyethylene supply tubing, and in communication with a fitting adapted to be attached to the above ground level fitting, meter, etc. The assembly includes an outer metal tube or sheath in order to comply with the safety code with respect to metal protection being required above ground level, and lead-in assemblies of this type include a number of structural variations, one of which being shown in U.S. Pat. No. 3,861,719.

Heretofore, natural gas lead-in assemblies have not met all the prerequisites desired, such as low cost, ease of handling and installation, adaptability to most types of installations, and ability to be readily formed or shaped by hand without kinking of the tubing.

BRIEF DESCRIPTION OF THE INVENTION

It is an object of the invention to provide a lead-in assembly for natural gas lines which is of an economical construction and will meet standard safety codes, which may be easily installed by operators of average skill and may be readily formed without special tools.

An additional object of the invention is to provide a gas line lead-in assembly utilizing a convoluted metal hose sheath for protecting the gas conduit wherein the sheath may be readily bent by hand and the assembly is resistant to kinking of the gas conduits.

In the practice of the invention a fitting for permitting the assembly to be attached to a gas meter, or the like, usually by threads, utilizes an elongated cylindrical nipple having a free end upon which synthetic plastic tubing, such as of polyethylene, is telescoped. An annular socket member superimposed over the portion of the tubing received upon the nipple is radially crimped upon this portion of the tubing to provide an effective frictional sealing engagement of the tubing with the nipple. An annular plug is closely mounted upon the synthetic plastic tubing in spaced axial relationship with respect to the fitting, and an annular convoluted metal hose encompasses the nipple and associated tubing and socket. One end of the hose is connected to the fitting and the other hose end is mounted upon the plug. An annular cap mounted upon the plug overlies that portion of the metal hose mounted thereon for forming an effective connection between the hose and plug.

The fitting is provided with projections or ribs complimentary in nature to the convolutions of the metal hose wherein the fitting end of the hose is mounted thereon to provide a strong mechanical interconnection between these components.

The resulting construction result in the gas transporting members being completely protected by the convoluted metal hose which is sealed to the inner conduit components at both ends, and this construction results in a lead-in assembly which complys with safety codes, resists corrosion and contamination, and permits manual shaping while resisting kinking of the inner conduits.

BRIEF DESCRIPTION OF THE DRAWINGS

The aforementioned objects and advantages of the invention will be appreciated from the following description and accompanying drawings wherein:

FIG. 1 is an elevational view of a gas line lead-in assembly in accord with the invention, the upper half being shown in diametrical section, FIG. 2 is a section taken through the socket of the assembly of FIG. 1 along Section II—II thereof, and FIG. 3 is an elevational view illustrating the assembly of the invention in use as connected to a gas meter located above ground level.

DESCRIPTION OF THE PREFERRED EMBODIMENT

With reference to FIG. 1, the components of the assembly include a fitting or adapter 10 upon which an elongated cylindrical nipple 12 is mounted. An annular socket 14 circumscribes the free end of the nipple in radial spaced relation thereto defining an annular chamber receiving an end of synthetic plastic tube 15, which may be formed of polyethylene. An annular plug 16 is mounted upon the tubing 15 and supports one end of a convoluted metal hose 18 which is mounted upon the fitting 10 at its other end in spaced radial relationship to the medium transporting members. An annular cap 19 is mounted upon the plug having a portion extending over the metal hose for producing a firm connection between the hose and plug.

The illustrated fitting 10 is in the form of a threaded adapter of an annular configuration including an exterior hexagonal flange 20 and exterior tapered pipe threads 22. The fitting is internally bored at 24 and provided with a coaxial recessed socket in which the nipple 12 is received and affixed by brazing, soldering, or the like. Convoluted projections or ribs 26 are defined upon the fitting for receiving the convoluted metal hose, as will be later described, and it will be appreciated that the fitting 10, rather than being exteriorly threaded, could be interiorly threaded, constitute a union or elbow, or be in other forms of conventional fitting commonly utilized in gas systems.

The nipple 12 is of considerable length with respect to its diameter, and is of a cylindrical configuration throughout its length. Adjacent its free end 28 the annular metal socket 14 is mounted thereon, and the socket includes an inwardly deformed end 30 which may be abutted by the end of tube 15. The radial dimension of the inner surface of the socket 14 is greater than the radial dimension of the outer nipple surface, the difference substantially corresponding to the wall thickness of the tube 15. The tube 15 is telescoped upon the free end of the nipple for two inches or more into the annular socket chamber defined between the nipple and socket 14, and the socket 14 is mechanically crimped inwardly, preferably at at least eight circumferentially equally spaced locations 32, FIG. 2, to force the tube material into a sealing and frictional engagement with the nipple. The crimping of the socket provides a strong mechanical interconnection between the tube and nipple, aided by nipple serrations 33.

The annular plug 16 is formed of rubber and is provided with a cylindrical bore 34 which closely receives the tube 15. The exterior configuration of the plug includes a recessed surface 36 defined by a radial shoulder, and a maximum diameter portion 38.

The convoluted metal hose 18 is attached at one end to the fitting 10 by being threaded upon the fitting ribs 26 and sealed by a mastic, and the other end of the hose is received upon the plug surface 36 in close mechanical relationship thereto, and the annular cap 19, of metal, mounted upon the plug 16 overlies a portion of the hose and is crimped thereon to seal the hose end, and maintain the assembly between the hose and plug. The metal hose spiral convolutions outer surface may be coated with polyvinyl chloride for corrosion resistance.

The entire lead-in assembly is illustrated in FIG. 1, and in a typical embodiment, the length from the end of the fitting 10 to the end of the tubing 15 will be approximately six feet, and the length from the end of the fitting to the plug 16 will be slightly over two feet. Of course, these dimensions may vary in accord with particular installations and customer specifications, but the length of the nipple 12 must usually be greater than the distance that the assembly will extend above the ground level to meet fire codes.

A typical installation utilizing the lead-in assembly of the invention is illustrated in FIG. 3. In this figure the ground level is indicated at 40, and a gas meter 42 is mounted upon support structure at a position above the ground level. The assembly is affixed to the end of a polyethylene high pressure gas supply conduit 44 by means of a conventional coupling 46. The coupling 46 is mounted at the end of the assembly tubing 15 wherein the tubing 15 and the supply conduit 44 will be coaxial at the coupling. As the buried conduit 44 will be substantially horizonital, the assembly must be bent into approximately a 90° configuration in order to permit the connection to meter 42, and the assembly may be readily shaped into the desired configuration due to the fact that the tubing 15 and the convoluted metal hose 18 readily permit lateral deformation without damage to these components. Also, as the end of the hose 18 is mechanically related to the tubing 15 through the plug 16 the shaping of the hose 18 will produce an identical and gradual deformation in the tube 15, which resists kinking of the tube and assures a full, unrestricted flow through the assembly. As that portion of the assembly which extends above the ground level 40 is entirely encased within the metal hose 18 the medium transporting members of the assembly will be protected within the metal hose meeting safety code requirements.

In manufacture, and transport, the lead-in assembly will normally be of a linear configuration, and the assembly will be shaped as desired for each particular installation, the only modification required to the assembly at each site being the deforming of the assembly, and as a conventional coupling 46 is utilized to connect the assembly to the gas supply conduit 44 no unusual assembling techniques are required necessitating special skills on the part of the installer.

It is appreciated that various modifications to the inventive concepts may be apparent to those skilled in the art without departing from spirit and scope of the invention.

We claim:

1. A lead-in conduit assembly for gas lines and the like characterized by its flexibility comprising, in combination, an annular end fitting having attachment means defined thereon and including an annular nipple having a first end sealingly affixed to said fitting and a second free end, a flexible synthetic plastic tube coaxially sealingly mounted on said nipple free end in communication therewith, an annular socket member mounted upon said nipple free end in radial spaced relationship thereto wherein said member and nipple free end define an annular socket chamber, an end of said tube being received within said socket chamber, said socket member being radially contracted on said tube sealingly and frictionally mounting said tube upon said nipple free end, an annular plug closely circumscribing said tubing axially spaced from said nipple, and a flexible metal hose encompassing said nipple and radial spaced therefrom having a first end mounted on said fitting and a second end mounted over said plug, means attaching said hose second end to said plug, said metal hose being capable of flexible lateral deformation whereby said assembly may be readily formed into a bend without kinking of said tube.

2. In a lead-in conduit assembly as in claim 1 wherein said metal hose comprises a tube having a convoluted surface to facilitate bending of said assembly.

3. In a lead-in conduit assembly as in claim 1, said socket member including aradially crimped portion to produce said radial contraction of said socket member on said tube.

4. In a lead-in conduit assembly as in claim 1, said metal hose being of a convoluted wall construction, and said mean attaching said hose second end to said plug including an annular cap mounted on said plug having a circumferential wall portion overlying said metal hose second end and crimped thereon.

5. In a lead-in conduit assembly as in claim 4, at least one annular rib defined upon said fitting, and a convolution of said hose first end being received upon said rib establishing a mechanical connection between said fitting and metal hose.

* * * * *